United States Patent
Huang et al.

(10) Patent No.: US 7,113,637 B2
(45) Date of Patent: Sep. 26, 2006

(54) APPARATUS AND METHODS FOR PATTERN RECOGNITION BASED ON TRANSFORM AGGREGATION

(75) Inventors: Yea-Shuan Huang, Hsinchu (TW); Chun-Wei Hsieh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 738 days.

(21) Appl. No.: 09/935,683

(22) Filed: Aug. 24, 2001

(65) Prior Publication Data
US 2003/0044067 A1 Mar. 6, 2003

(51) Int. Cl.
*G06K 9/00* (2006.01)

(52) U.S. Cl. ........................ 382/165; 382/181; 382/190

(58) Field of Classification Search ........ 382/115–119, 382/164–165, 171–180, 190–199, 293, 295, 382/296, 297
See application file for complete search history.

(56) References Cited

U.S. PATENT DOCUMENTS

| 5,093,869 | A | * | 3/1992 | Alves et al. ................. 382/199 |
| 5,542,006 | A | * | 7/1996 | Shustorovich et al. ...... 382/156 |
| 5,565,352 | A | | 10/1996 | Hochstrasser et al. |
| 5,745,873 | A | | 4/1998 | Braida et al. |
| 5,893,058 | A | | 4/1999 | Kosaka |
| 5,930,380 | A | | 7/1999 | Kashi et al. |
| 5,974,521 | A | | 10/1999 | Akerib |
| 6,067,369 | A | * | 5/2000 | Kamei ......................... 382/125 |
| 6,181,805 | B1 | * | 1/2001 | Koike et al. ................. 382/118 |
| 6,453,069 | B1 | * | 9/2002 | Matsugu et al. ............. 382/173 |
| 6,671,404 | B1 | * | 12/2003 | Kawatani et al. ........... 382/190 |

OTHER PUBLICATIONS

Ruiz-del-Solar, "Neural-based architectures for the segmentation of textures", I.E.E.E. Pattern Recognition 2000, pp.: 1080-1083 vol. 3.*
Avrithis, "Affine-invariant curve normalization for shape-base retrieval", I.E.E.E. Pattern Recognition, 2000, pp.: 1015-1018 vol. 1.*
L. Xu et al., "Methods of Combining Multiple Classifiers and Their Applications to Handwriting Recognition," IEEE Transactions on Systems, Man, and Cybernetics, vol. 22, No. 3, May/Jun. 1992.
Y.S. Huang et al., "A Method of Combining Multiple Experts for the Recognition of Unconstrained Handwritten Numerals", IEEE Transaction on Pattern Analysis and Machine Intelligence, vol. 17, No. 1, Jan. 1995.
F.F. Soulie et al., "Multi-Modular Neural Network Architectures: Applications, in Optical Character and Human Face Recognition", Int. Journal of Pattern Recognition and Artificial Intelligence, vol. 7, No. 4, pp. 721-755, Aug. 1993.

* cited by examiner

*Primary Examiner*—Jingge Wu
*Assistant Examiner*—Brian Le
(74) *Attorney, Agent, or Firm*—Finnegan, Henderson, Farabow, Garrett & Dunner, L.L.P.

(57) ABSTRACT

In order to improve pattern recognition, various kinds of transformations are performed on an input object. One or more recognition algorithms are then performed on the input object transforms in addition to the input object itself. By performing recognition algorithms on an input object and its transforms, a more comprehensive set of recognition results are generated. A final recognition decision is based upon an input object and its transforms by aggregating the recognition results.

10 Claims, 10 Drawing Sheets

APPARATUS AND METHODS FOR PATTERN RECOGNITION BASED ON TRANSFORM AGGREGATION

FIELD OF THE INVENTION

This invention relates generally to pattern recognition. More particularly, it relates to apparatus and methods for pattern recognition based on transform aggregation.

BACKGROUND OF THE INVENTION

Pattern recognition has been studied for over three decades. However, recent advances have allowed pattern recognition to become widely used in various applications, such as, face recognition systems, character/handwriting recognition systems, biometric recognition systems, video surveillance systems, etc.

FIG. 1a shows a conventional pattern recognition system for recognizing faces. As shown in FIG. 1a, a camera 102 takes an image of scene 100 and provides an image signal to a recognizer 104. Typically, recognizer 104 includes a face detector module 106 and a face matcher 108.

Face detector module 104 detects a portion of the image signal (i.e., an image of scene 100) that is relevant for matching. For example, as illustrated in FIG. 1b, face detector module 106 may detect a face of a person in an image portion 130 of scene 100. After detecting image portion 130, face detector module 104 then segments image portion 130 from the image signal. For example, as illustrated in FIG. 1c, face detector module 106 may isolate image portion 130, e.g., the person's face, to form an image segment 140.

Face matcher 108 receives image segment 140 from face detector module 106. Face matcher 108 includes a feature extractor module 110 and a matching module 112. Feature extractor module 110 extracts any relevant features identified in image segment 140. For example, as illustrated in FIG. 1d, feature extractor module extracts features 142, 144, 146, and 148, e.g., location of the eyes, distance between the eyes, location of the nose, and location of the mouth, from image segment 140.

Matching module 112 searches a memory 114 to find a stored pattern (not shown), which matches image segment 140 based on features 142, 144, 146, and 148. Matching module 112 typically makes a decision as to which stored pattern or patterns match image segment 140 according to a predetermined decision rule.

Output module 116 receives the decision from matching module 112 and outputs the decision to a user. For example, as shown in FIG. 1a, output module 116 may output the three closest matching faces to a display 118.

Unfortunately, due to variation factors, conventional pattern recognition systems are often inaccurate. For example, variation factors such as scale, e.g., caused by a person being either closer or farther away, and rotation, e.g., caused by a person being slightly turned relative to camera 102, may cause the input image to not be matched to its corresponding stored pattern. Also, detecting relevant portions, e.g., image portion 130, of certain types of images, such as gray-level images, may be incomplete or imprecise and may cause an image portion to have missing or extraneous features. Thus, conventional pattern recognition systems often produce erroneous recognition decisions.

In addition, conventional pattern recognition systems often use a single recognizer. A single recognizer makes a recognition decision based on a single recognition algorithm. Many efforts have been made to develop more sophisticated recognition algorithms to improve the performance of conventional single recognizer systems. However, such systems using sophisticated recognition algorithms are still prone to inaccurate results because of the above-mentioned variation factors.

Stricter normalization of images during pre-processing has also been studied as a way to improve performance. For example, normalization of images may be used to minimize the effect of variation factors, e.g., such as scale and rotation. For example, images may be normalized to a fixed size. However, some variation factors, e.g., border shift, are difficult to detect. Also, even if a variation factor is detected, it may be difficult to accurately compensate for its effect to ensure an accurate recognition decision.

Finally, some conventional pattern recognition systems may combine several recognizers using multiple recognition algorithms and/or modules thereof to enhance recognition accuracy. For example, combining several different recognizers with different matching modules may increase accuracy since the different recognizers may complement each other in a group decision. However, combining several recognizers is expensive to implement, and requires a large amount of memory.

In addition, under certain circumstances, the combined recognizers may not complement each other, since they may disagree on a recognition decision. Combining several recognizers also requires a large amount of samples to "train" the recognizers to work together. Therefore, combining several recognizers often results in a complex system, which may not perform well when only a relative small number of training examples are available. It is accordingly desirable to improve recognition accuracy using relatively simple and inexpensive systems.

SUMMARY OF THE INVENTION

In accordance with an aspect of the invention, a method of processing an input object for pattern recognition comprises: receiving an input object; segmenting a target object from the input object to form a segmented target object; performing at least one transform on the segmented target object to generate at least one transformed object; and outputting the segmented target object and the at least one transformed object to at least one pattern recognizer.

In accordance with another aspect of the invention, a method of processing an input object for pattern recognition comprises: receiving an input object; detecting a target object within the input object; segmenting the target object from the input object to form a plurality of segmented target objects; and outputting the segmented target objects to at least one pattern recognizer.

In accordance with another aspect of the invention, a method of aggregating a plurality of recognition results comprises: receiving a segmented target object and at least one transform of the segmented target object; performing at least one pattern recognition algorithm on the segmented target object and the at least one transform to generate a plurality of recognition results; aggregating the plurality of recognition results to determine a recognition decision; and outputting the recognition decision.

In accordance with another aspect of the invention, a pattern recognition system comprises: an input to receive an input object; an object detector to detect a target object within the input object; at least one transform module to perform at least one transform on the target object to form a plurality of transformed objects; at least one pattern recognizer for generating a plurality of recognition results based on the target image and the plurality of transformed objects; and a recognition result aggregator for determining a recognition decision based on the plurality of recognition results.

In accordance with another aspect of the invention, pattern recognition system comprises: an input to receive an input object; an object detector to detect a target object and to form a plurality of segmented target objects; at least one pattern recognizer for generating a plurality of recognition results based on the plurality of segmented target objects; and a recognition result aggregator for determining a recognition decision based on the plurality of recognition results.

In accordance with another aspect of the invention, a pattern recognition apparatus comprises: input means for receiving an input object; transform means for performing at least one transform on the input object to generate at least one transformed object; recognizer means for performing at least one pattern recognition algorithm on the input object and the at least one transformed object to generate a plurality of recognition results; aggregating means for aggregating the plurality of recognition results to determine a recognition decision; and decision output means for outputting the recognition decision.

In accordance with another aspect of the invention, an apparatus for processing an input object for pattern recognition comprises: input means receiving an input object; segmentation means for segmenting a target object from the input object to form a segmented target object; transform means for performing at least one transform on the segmented target object to generate at least one transformed object; and output means for outputting the segmented target object and the at least one transformed object to at least one pattern recognizer.

In accordance with another aspect of the invention, an apparatus for processing an input object for pattern recognition comprises: input means for receiving an input object; segmentation segmenting at least one target object from the input object to form a plurality of segmented target objects; and output means for outputting the segmented target objects to at least one pattern recognizer.

In accordance with another aspect of the invention, an apparatus for aggregating a plurality of recognition results comprises: means for receiving a segmented target object and at least one transform of the segmented target object; means for performing at least one pattern recognition algorithm on the segmented target object and the at least one transform of the segmented target object to generate a plurality of recognition results; means for aggregating the plurality of recognition results to determine a recognition decision; and means for outputting the recognition decision.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to exemplary embodiments of the invention, examples of which are illustrated in the accompanying drawings. Wherever possible, the same reference numbers will be used throughout the drawings to refer to the same or like parts.

Figure 1A:
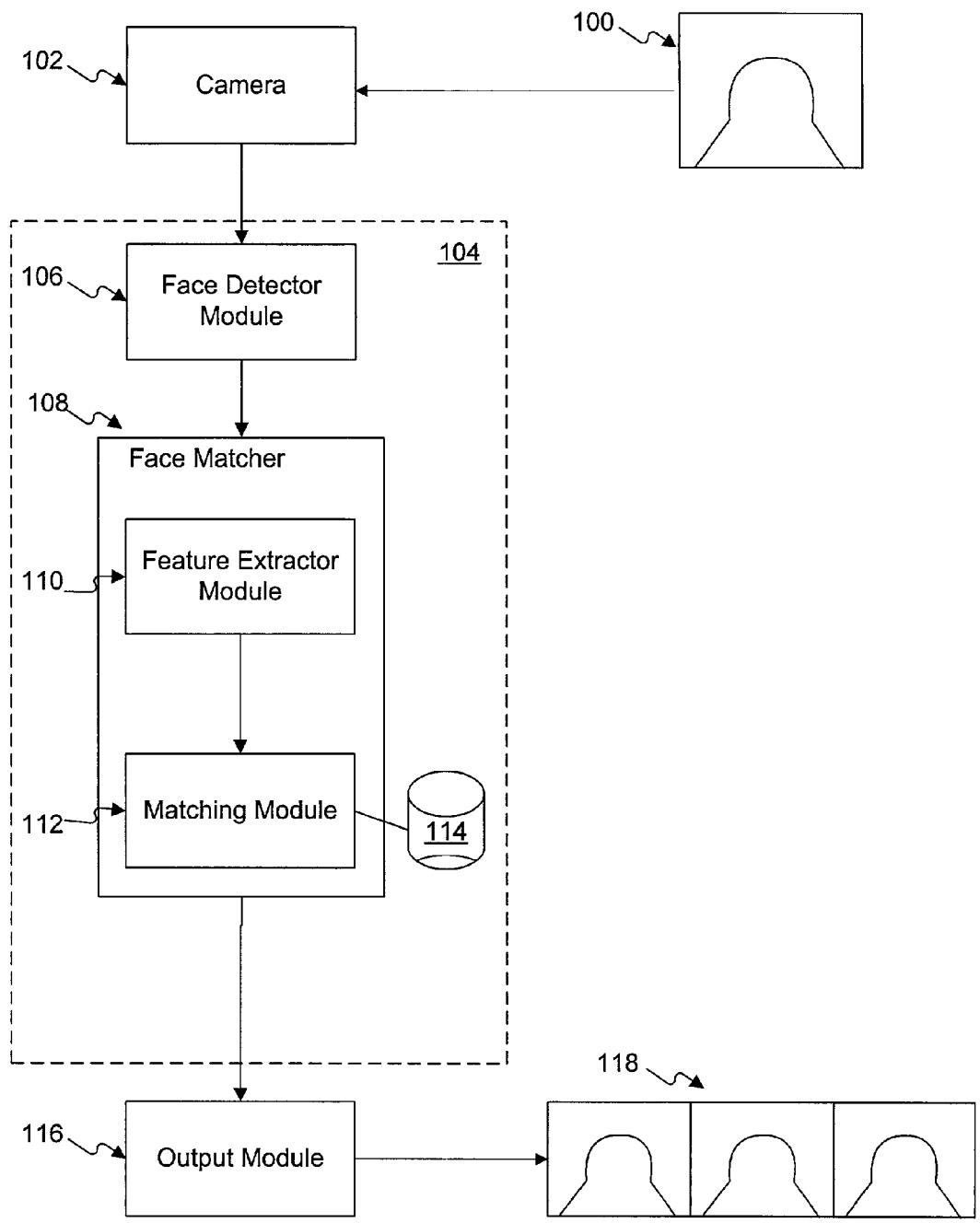
FIG. 1a shows a conventional pattern recognition system for recognizing faces.
Figure 1B:
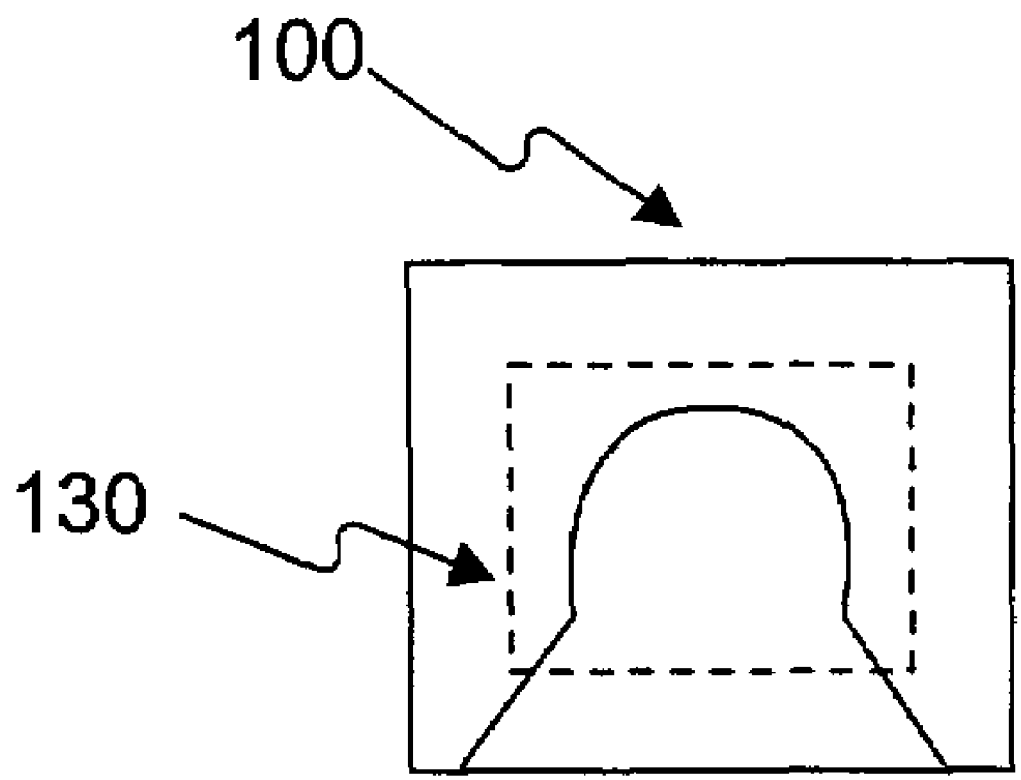
FIG. 1b illustrates a conventional face detector module detecting a person's face.
Figure 1C:
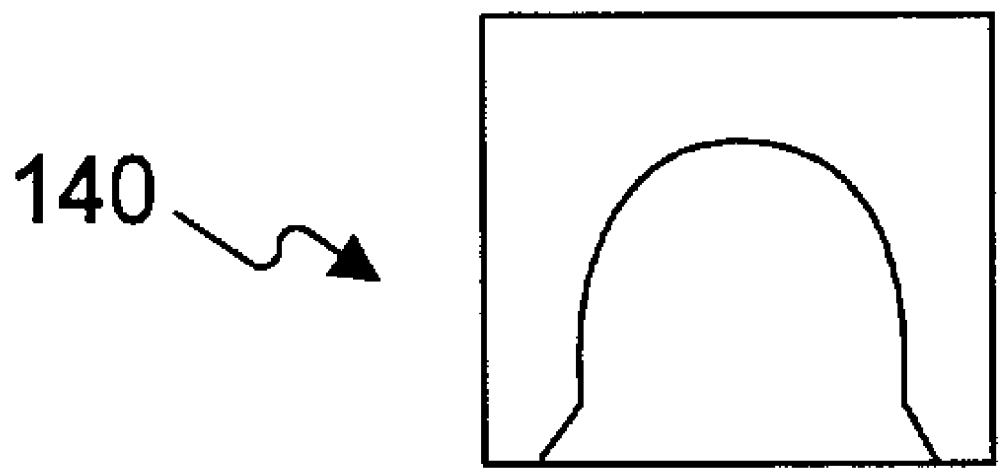
FIG. 1c illustrates a conventional pre-processor module segmenting an image portion from an input image into an object segment.
Figure 1D:
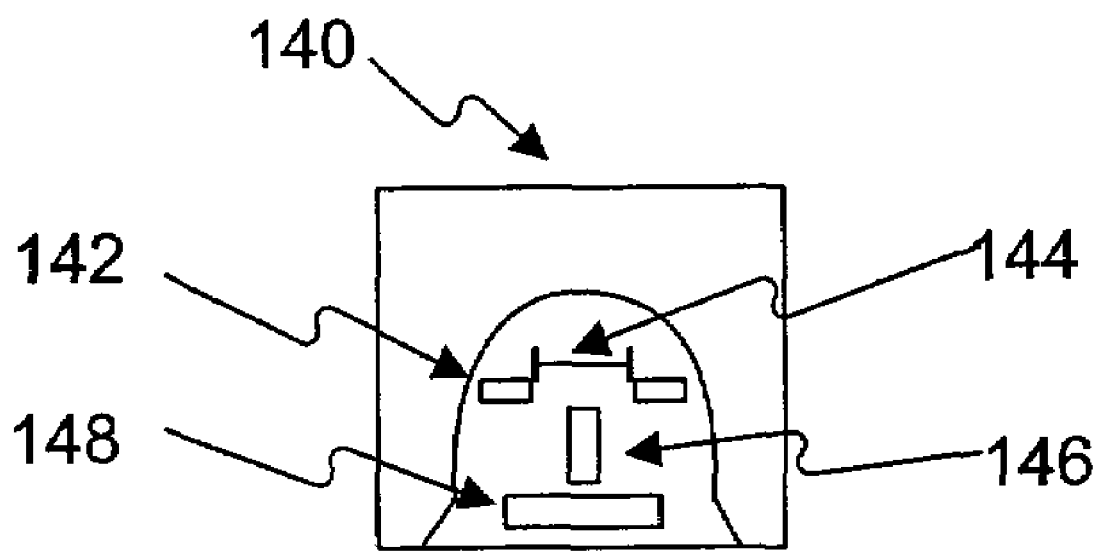
FIG. 1d illustrates a conventional feature extractor module extracting features from an object segment.
Figure 2:
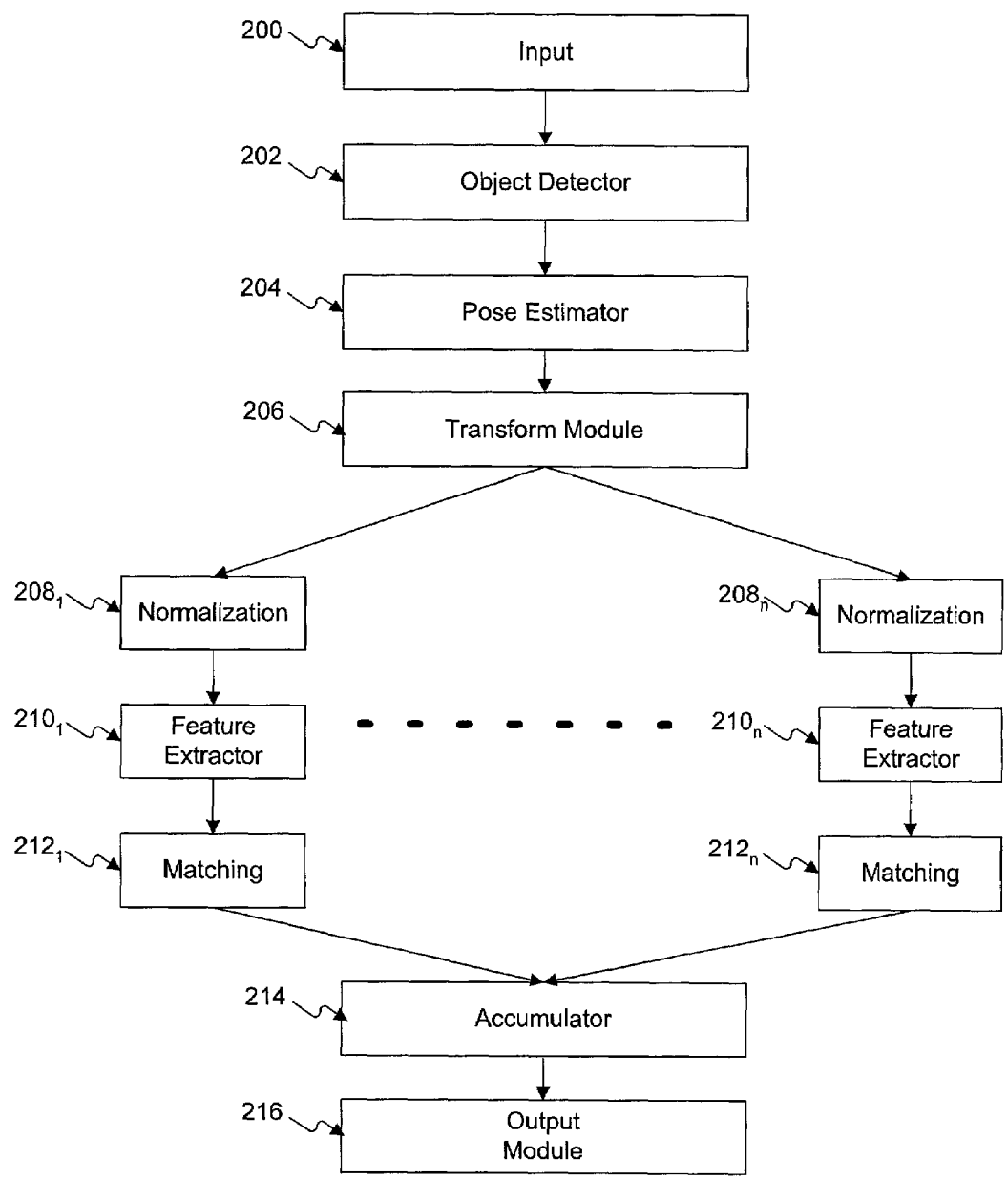
FIG. 2 shows one embodiment of a pattern recognition system utilizing multiple transforms of an input object consistent with the principles of the present invention.

FIG. 2 shows one embodiment of a pattern recognition system utilizing multiple transforms of an input object consistent with the principles of the present invention. An input object is received. The input object may represent a wide variety of objects in which a pattern can be recognized, such as, objects representing faces, handwriting, biometrics, etc. In addition, the input object may comprise a plurality of image samples, e.g., samples of a person's face (not shown). A target object, such as an image of a person's face, is detected and segmented from the input object. Processing such as pose estimation is performed on the segmented target object. One or more transforms are then performed on the segmented target object to create a set of transformed objects. The segmented target object and the set of transformed objects are then processed, e.g., normalized and features extracted. The segmented target object and set of transformed objects are searched against a database of stored images to create a set of matching results. The matching results are aggregated and a matching decision is made. The matching decision is then provided, e.g., to a user.

In particular, FIG. 2 shows: an input 200; an object detector 202; a pose estimator 204; a transform module 206; normalization modules $208_1$–$208_n$; extraction modules $210_1$–$210_n$; matching modules $212_1$–$212_n$; an accumulator 214; and an output module 216. Input 200 receives an input object. In one embodiment, input 200 may receive one or more input objects representing an image of a person's face. Input 200 may receive the input object from an external device, such as a camera (not shown). Alternatively, the device generating an input object may be integrated within input 200. Input 200 then provides the input object to object detector 202.

Object detector 202 detects and segments a target object within the input object. Object detector 202 may be implemented by any combination of hardware and software and using known algorithms to detect the target object. For example, in one embodiment, object detector 202 uses known algorithms to detect a person's face as the target object. After detecting a target object (i.e., a person's face), object detector 202 segments the target object to form a segmented target object. Object detector 202 then provides the segmented target object to pose estimator 204.

Pose estimator 204 determines a spatial orientation of the target object within the segmented target object. For example, the target object may be tilted or rotated at a particular angle, e.g., due to person's position relative to a camera. Pose estimator 204 may use known algorithms to search for features within the target object such as a person's eyes, mouth, or nose. Based on the location and orientation of these features, pose estimator 204 calculates the spatial orientation of the target object within the segmented target object. Pose estimator 204 may also use other algorithms for pose estimation in accordance with the principles of the present invention.

Transform module 206 then performs a plurality of transforms on the segmented target object based on the spatial relationship of the target object to generate a set of transformed objects. By generating a set of transformed objects, transform module 206 may provide a more comprehensive set of images to minimize variation factors, such as an offset or rotation in the target object within the segmented target object. For example, transform module 206 may perform transforms such as: a rotation transform; an affine transform; a left boundary shift transform; a right boundary shift transform; a top boundary shift transform; and a bottom boundary shift transform. For example, transform module 206 may perform the rotation transform when pose estimator 204 calculates that the target object is turned at a particular angle within the segmented target object. Transform module 206 may also shift one or more of the boundaries (i.e., left, right, top, or bottom) when pose estimator 204 calculates that the target object is offset within the segmented target object. However, transform module 206 may perform any number of a wide variety of transforms either individually or in combination, in accordance with the principles of the present invention. For example, transform module 206 may also combine one or more transform algorithms to form a more sophisticated transform.

Transform module 206 then provides the set of transformed objects to normalization modules $208_1$–$208_n$. Transform module 206 may distribute the set of transformed objects in a wide variety of ways. For example, transform module 206 may provide one or more transformed objects to each normalization module. Alternatively, transform module 206 may provide the entire set of transformed objects to each normalization module.

Normalization modules $208_1$–$208_n$ standardize transformed objects provided from transform module 206 to form, e.g., one or more standardized candidate images. For example, normalization modules $208_1$–$208_n$ may each use known algorithms to standardize the transformed objects to a particular size, gray scale, contrast, or brightness. However, normalization modules $208_1$–$208_n$ may use any of a wide variety of algorithms in accordance with the principles of the present invention. After the transformed objects are normalized, each of the normalization modules $208_1$–$208_n$ provide their candidate images to their corresponding feature extraction modules $210_1$–$210_n$.

Feature extraction modules $210_1$–$210_n$ extract relevant features from the one or more candidate images. For example, feature extraction modules $210_1$–$210_n$ may use known algorithms to extract e.g., location of the eyes, distance between the eyes, location of the nose, and location of the mouth as relevant features from a candidate image. Each of feature extraction modules $210_1$–$210_n$ may use an identical algorithm. Alternatively, feature extraction modules $210_1$–$210_n$ may use different algorithms, e.g., based upon the underlying transform used to form the one or more candidate images.

Matching modules $212_1$–$212_n$ search a database of stored images (not shown) based on the features extracted by feature extraction modules $210_1$–$210_n$ and match a candidate image to one of the stored images. Matching modules $212_1$–$212_n$ then generates one or more recognition results based on the search. The recognition results may include one or more of the stored images which match or substantially match the respective candidate image. Matching modules $212_1$–$212_n$ may use known algorithms to match a respective candidate image to a stored image. However, any of a wide variety of algorithms may be used in accordance with the principles of the present invention. Matching modules $212_1$–$212_n$ may each use the same algorithm. Alternatively, matching modules $212_1$–$212_n$ may use different algorithms based upon the underlying transform used to form the candidate image. For example, matching module $212_1$ may use a different algorithm from matching module $212_n$. Matching modules $212_1$–$212_n$ then submit their respective recognition results to accumulator 214.

Accumulator 214 receives the recognition results from each of the matching modules $212_1$–$212_n$ and makes one or more recognition decisions. In one embodiment, accumulator 214 uses the following equations:

$$D(x) = j, \text{ if } G_j(S_j(F_0(x)), \ldots, S_j(F_N(x)))$$
$$= \underset{1 \leq k \leq K}{\arg\max} G_k(S_k(F_0(x)), \ldots, S_k(F_n(x))) \text{ where:}$$

D denotes a decision rule function;

$G_k(x)$ denotes a given aggregation rule function indicating a possibility that x belongs to a class k;

$S_k(x)$ denotes the probability that x belongs to a class k;

$F_n(x)$ denotes an extracted feature of an nth transformed image, where $F_o(x)$ is the extracted feature of the original input pattern x;

x denotes a segmented pattern in a segmented input object with N number of transformations performed, where n is $1 \leq n \leq N$;

j denotes a matching object;

k denotes a pattern class in a concerned pattern with K sets of pattern classes in a class domain, $C_1, \ldots, C_k$, where k is $1 \leq k \leq K$; and $G_j(S_k(F_o(x)), \ldots, S_k(F_N(x))) = \max S_k(F_n(x))$ from 0 to N.

Alternatively, accumulator 214 may use the following equation for aggregation of recognition results:

$$G_j(S_k(F_o(x)), \ldots, S_k(F_N(x))) = (1/N)\Sigma S_k(F_n(x)) \text{ from } n=0 \text{ to } N.$$

However, accumulator 214 may use a wide variety of algorithms for aggregating and making one or more recognition decisions in accordance with the principles of the present invention. Accumulator 214 then provides the one or more recognition decisions to output module 216.

Output module 216 provides the one or more recognition results, e.g., to a user (not shown). Output module 216 may provide the one or more recognition results in a wide variety of ways, such as a display, an electronic file on a computer readable medium, or a hardcopy printout. For example, in one embodiment, output module 216 is a screen display. However, any output module, which allows a user to receive and interpret the one or more recognition decisions, is in accordance with the principles of the present invention.

Figure 3:
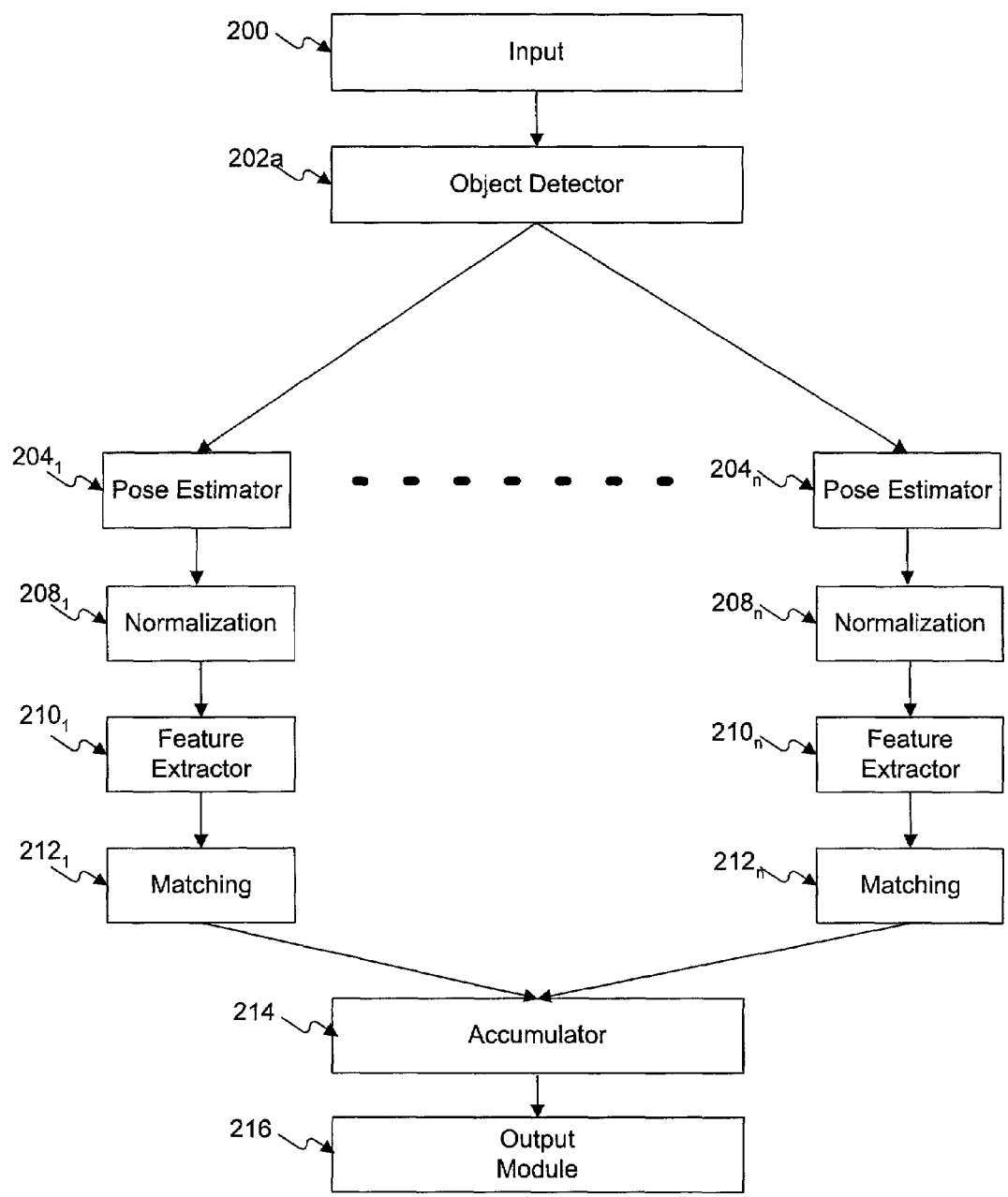
FIG. 3 shows an alternative embodiment of a pattern recognition system utilizing multiple segmentation of an input object consistent with the principles of the present invention.

FIG. 3 shows an alternative embodiment of a pattern recognition system utilizing multiple segmentation of an input object consistent with the principles of the present invention. An input object is received. A target object is detected within the input object. The input object is processed and segmented multiple times into a plurality of segmented target objects, e.g., to minimize variation factors. Each of the segmented target objects is processed, e.g., pose estimated, normalized and features extracted. Each of the segmented target objects is then searched against a database of stored images to create a set of matching results. The matching results are aggregated and a matching decision is made. The matching decision is then provided, e.g., to a user.

In particular, FIG. 3 shows: input 200; an object detector 202a; pose estimators $204_1$–$204_n$; normalization modules $208_1$–$208_n$; extraction modules $210_1$–$210_n$; matching modules $212_1$–$212_n$; accumulator 214; and output module 216. Input 200 receives an input object. Input 200 then provides the input object to object detector 202a. Object detector 202a detects a target object within the input object and provides a plurality of segmented target objects. For example, object detector 202a may use one or more known algorithms to detect a person's face as the target object. For each different algorithm, object detector 202a may form a different segmented target object and, thus, create a set of varying segmented target objects, e.g., from a single input object. The set of segmented target objects from object detector 202a provides a more comprehensive set of images, e.g., to minimize variation factors and to increase recognition accuracy. Accordingly, a transform module, such as transform module 206 shown with respect to FIG. 2, in conjunction with object detector 202a is not required. However, a transform module may be implemented in conjunction with object detector 202a, in accordance with the principles of the present invention. Object detector 202a may also execute an algorithm multiple times to develop a plurality of segmented target objects. Object detector 202a then provides the plurality of segmented target objects to pose estimators $204_1$–$204_n$. Object detector 202a may distribute the plurality of segmented target objects in a wide variety of ways. For example, object detector 202a may provide one or more segmented target objects to each pose estimator. Alternatively, object detector 202a may provide the entire plurality of segmented target objects to each pose estimator.

Pose estimators $204_1$–$204_n$ are similar to pose estimator 204 described above with respect to FIG. 2. In particular, pose estimators $204_1$–$204_n$ determine a spatial orientation of the target object within their respective segmented target object. Normalization modules $208_1$–$208_n$ then standardize the segmented target object to form, e.g., a set of candidate images. Normalization modules $208_1$–$208_n$ then provide their respective candidate images to feature extraction modules $210_1$–$210_n$.

As described above with respect to FIG. 2, feature extraction modules $210_1$–$210_n$ extract relevant features in a corresponding candidate image. Matching modules $212_1$–$212_n$ then search a database of stored images (not shown) based on the extracted relevant features and match their respective candidate image to one of the stored images. Matching modules $212_1$–$212_n$ generate one or more recognition results based on the search. Matching modules $212_1$–$212_n$ then submit their respective recognition results to accumulator 214.

As described above with respect to FIG. 2, accumulator 214 receives the recognition results from each of the matching modules $212_1$–$212_n$ and makes one or more recognition decisions. Output module 216 then provides the one or more recognition decisions.

Figure 4:
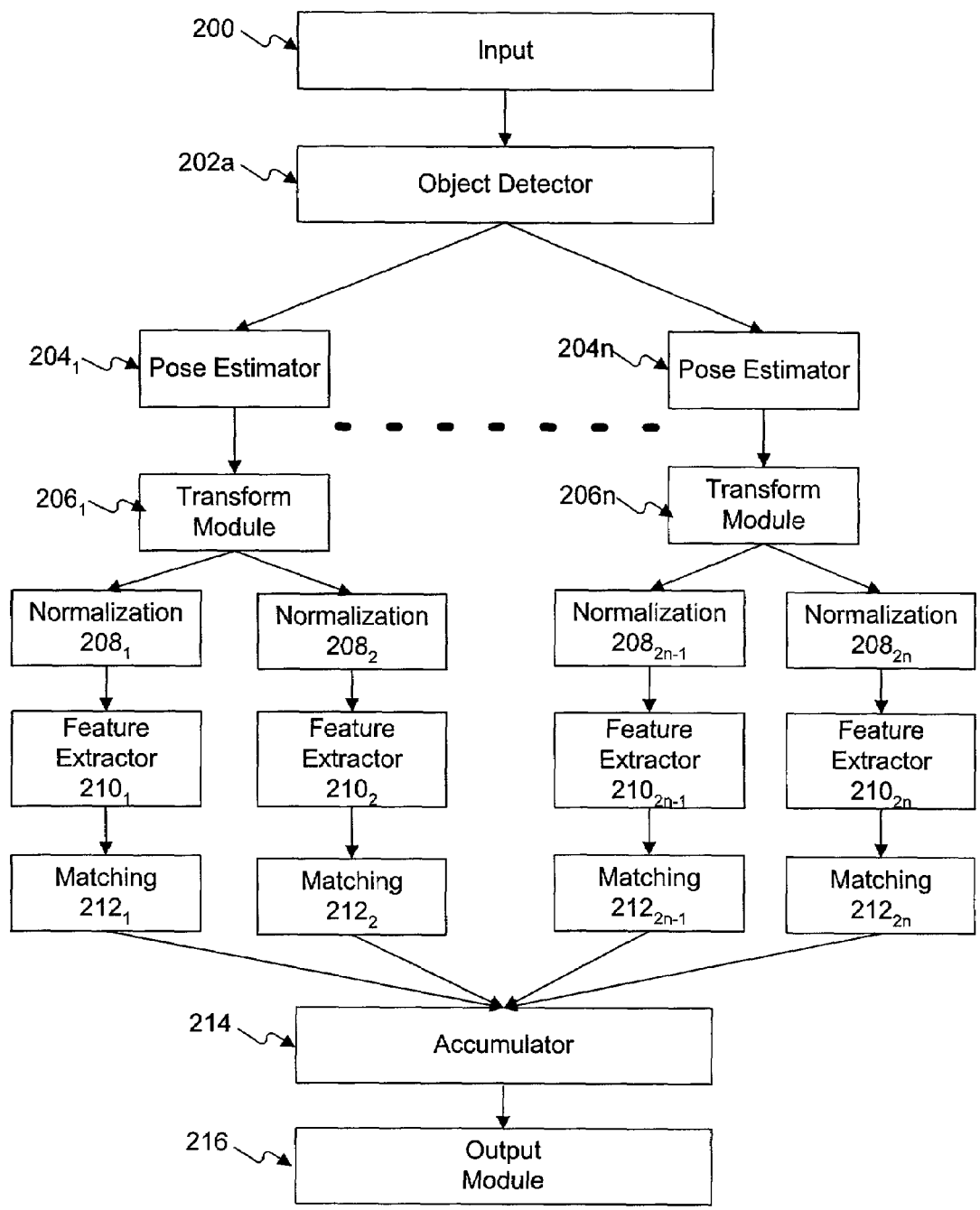
FIG. 4 shows another alternative embodiment of a pattern recognition system utilizing multiple segments of an input object and multiple transforms consistent with the principles of the present invention.

FIG. 4 shows another alternative embodiment of a pattern recognition system utilizing multiple segments of an input object and multiple transforms consistent with the principles of the present invention. An input object is received. A target object is detected within the input object. The input object is then processed and segmented multiple times into a plurality of segmented target objects, e.g., to account for variation factors and increase recognition accuracy. Each of the segmented target objects is processed, e.g., pose estimated. Multiple transforms are also performed on each of the segmented target objects to form a plurality of transformed objects. Each of the plurality of transformed objects is then searched against a database of stored images to create a set of matching results. The matching results are aggregated and a matching decision is made. The matching decision is then provided, e.g., to a user.

In particular, FIG. 4 shows: input 200; object detector 202a; pose estimators $204_1$–$204_n$; transform modules $206_1$–$206_n$; normalization modules $208_1$–$208_{2n}$; extraction modules $210_1$–$210_{2n}$; matching modules $212_1$–$212_{2n}$; accumulator 214; and output module 216. Input 200 receives an input object. Input 200 then provides the input object to object detector 202a. As described above with respect to FIG. 3, object detector 202a detects a target object within the input object and provides a plurality of segmented target objects. Object detector 202a then distributes the plurality of segmented target objects to pose estimators $204_1$–$204_n$. As described above, pose estimators $204_1$–$204_n$ determine a spatial orientation of the target object within their respective segmented target object. As described above, transform modules $206_1$–$206_n$ may then perform a plurality of transforms on their respective segmented target object based on the spatial relationship of the target object to generate a set of transformed objects. Transform modules $206_1$–$206_n$ then distribute the set of transformed objects to their respective normalization modules, i.e., normalization modules $208_1$–$208_{2n}$. For purposes of illustration, FIG. 4 shows transform modules $206_1$–$206_n$ distributing transformed objects to two sets of subsequent modules. For example, as shown in FIG. 4, transform module $206_1$ may distribute transformed objects, e.g., to normalization modules $208_1$ and $208_2$, feature extraction modules $210_1$ and $210_2$, and matching modules $212_1$ and $212_2$ while transform module $206_n$ may distribute transformed objects, e.g., to normalization modules $208_{2n-1}$ and $208_{2n}$, feature extraction modules $210_{2n-1}$ and $210_{2n}$, and matching modules $210_{2n-1}$ and $210_{2n}$. Alternatively, any number of sets of intervening modules for each transform module may be used in accordance with the principles of the present invention.

As described above, normalization modules $208_1$–$208_{2n}$ standardize the transformed objects to form, e.g., a set of candidate images. After the transformed objects are normalized, each of the normalization modules $208_1$–$208_{2n}$ provide the candidate images to their respective feature extraction modules $210_1$–$210_{2n}$. Feature extraction modules $210_1$–$210_{2n}$ extract relevant features in their corresponding candidate image and provide them to corresponding matching modules $212_1$–$212_{2n}$.

As described above, matching modules $212_1$–$212_{2n}$ then may search a database of stored images (not shown) based on the extracted features and match their respective candidate image to one of the stored images. Matching modules $212_1$–$212_{2n}$ then generates one or more recognition results based on the search. Matching modules $212$–$212_{2n}$ then submit their respective recognition results to accumulator 214. Accumulator 214 receives the recognition results from each of the matching modules $212$–$212_{2n}$ and makes one or more recognition decisions. Output module 216 then provides the one or more recognition decisions, e.g., to a user (not shown).

Figure 5:
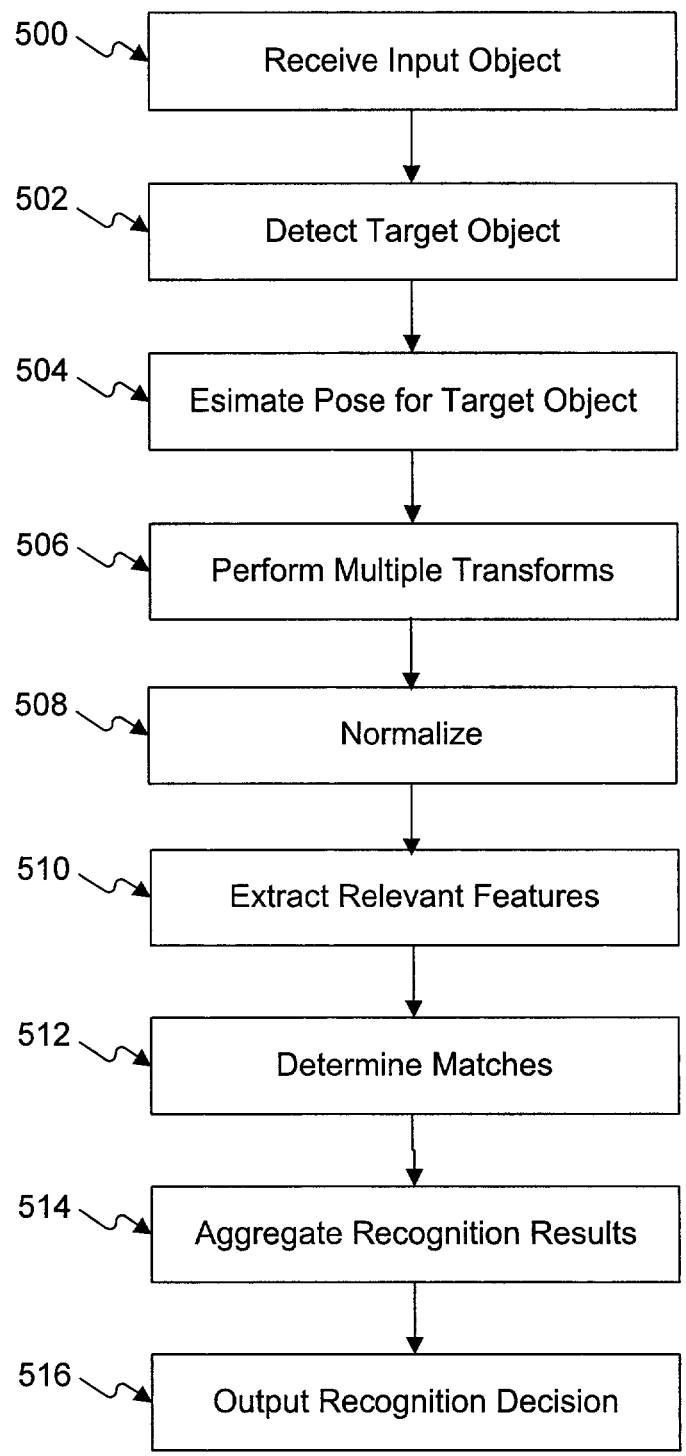
FIG. 5 shows a method for pattern recognition performed by the system of FIG. 2 in accordance with the principles of the present invention.

FIG. 5 shows a method for pattern recognition performed by the system of FIG. 2 in accordance with the principles of the present invention. In particular, in step 500, input 200 receives an input object and provides the input object to object detector 202. In step 502, object detector 202 detects a target object within the input object and forms a segmented target object. In step 504, pose estimator 204 estimates a pose for the target object within the segmented target object.

In step 506, transform module 206 performs one or more transforms on the segmented input object, e.g., to account for variation factors. For example, let: T represent a segmented target object an image; T(x, y) is a pixel of T at an xth horizontal and yth vertical; and T' is a transform of T. Accordingly, a transform for rotating a segmented target object T by θ degrees, may be defined as T'(x',y')=T(x,y) where x'=cosθ×+sinθy; and y'=−sinθ×+cosθy.

As another example, an affine transform, where a11, a12, a21, a22, b2, and b2 may be arbitrary constants, may be defined as T'(x', y')=T(x, y) where x'=a11 x+a12 y+b1; and y'=a21 x+a22 y+b2.

Transform module 206 may also perform transforms using known algorithms for scale adjustment, contrast adjustment, or boundary shift. However, any of a wide variety of transforms are in accordance with the principles of the present invention. The number and type of transforms performed by transform module 206 may be pre-determined or may be varied in accordance with the principles of the present invention. In step 508, normalization modules $208_1$–$208_n$ normalize their respective transformed object to form a candidate image. In step 510, feature extraction modules $210_1$–$210_n$ extract relevant features in their respective candidate images. In step 512, matching modules $212_1$–$212_n$ search a database to find one or more matches for their respective candidate images. In step 514, accumulator 214 aggregates the recognition results from matching modules $212_1$–$212_n$ and makes one or more recognition decisions. In step 516, output module 216 provides the one or more recognition decisions.

Figure 6:
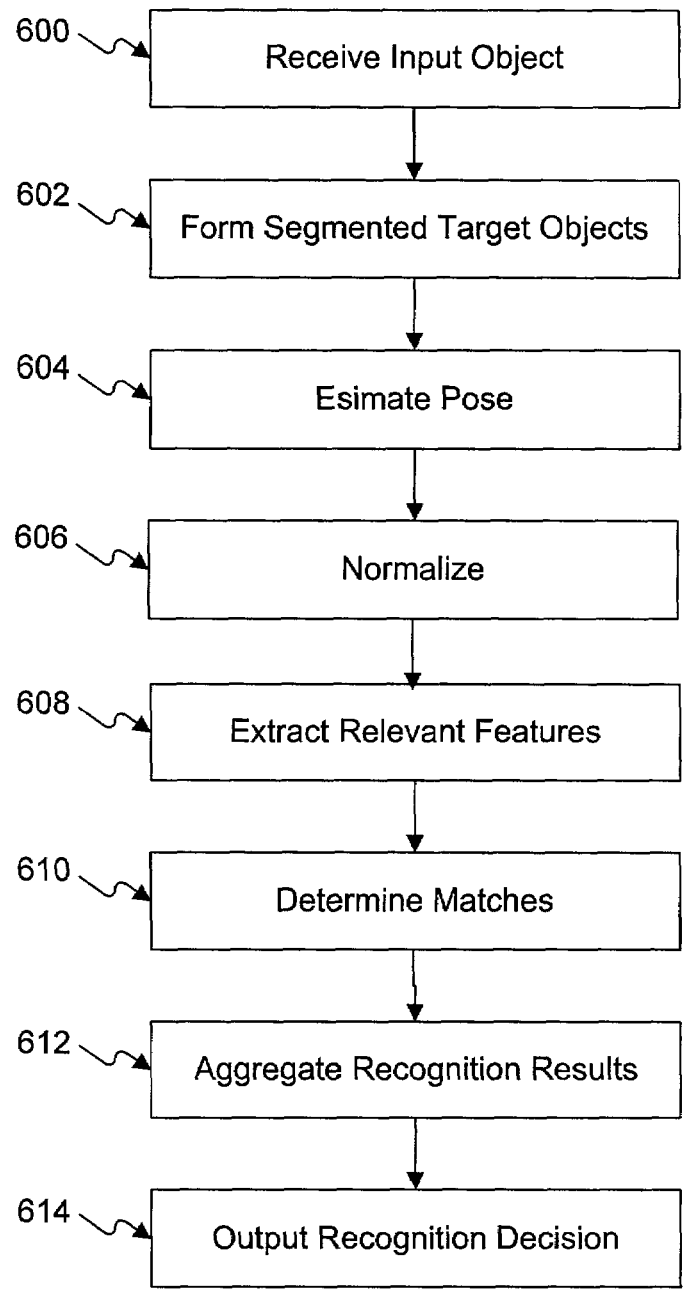
FIG. 6 shows a method for pattern recognition performed by the system of FIG. 3 in accordance with the principles of the present invention.

FIG. 6 shows a method for pattern recognition performed by the system of FIG. 3 in accordance with the principles of the present invention. In particular, in step 600, input 200 receives an input object and provides the input object to object detector 202a. In step 602, object detector 202a executes one or more algorithms to detect a target object and forms a plurality of segmented target objects, e.g., to account for variation factors. In step 604, pose estimator modules $204_1$–$204_n$ estimate a pose for the target object within their respective segmented target objects.

In step 606, normalization modules $208_1$–$208_n$ normalize their respective segmented target objects to form a candidate image. In step 608, feature extractor modules $210_1$–$210_n$ extract relevant features in their respective candidate image. In step 610, matching modules $212_1$–$212_n$ search a database to find one or more matches for their respective candidate image. In step 612, accumulator 214 aggregates the recognition results from matching modules $212_1$–$212_n$ and makes one or more recognition decisions. In step 614, output module 216 provides the one or more recognition decisions.

Figure 7:
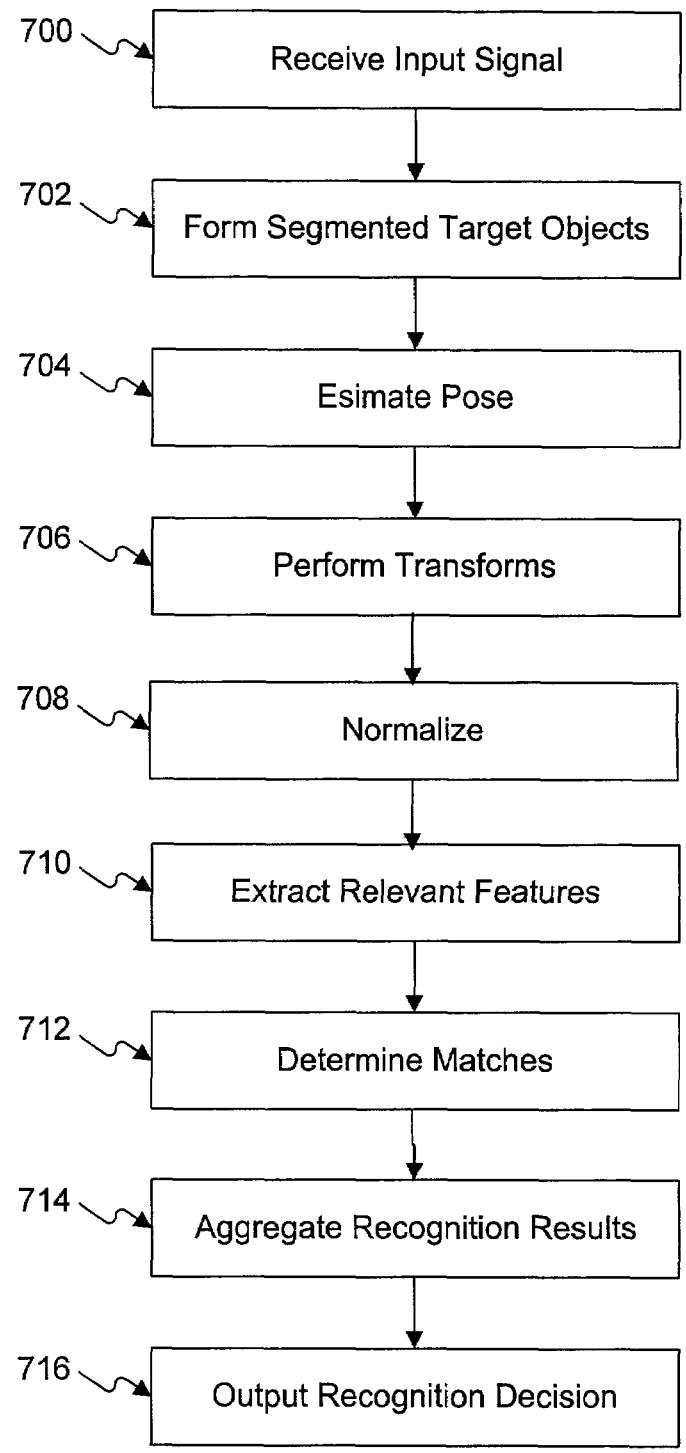
FIG. 7 shows a method for pattern recognition performed by the system of FIG. 4 in accordance with the principles of the present invention.

FIG. 7 shows a method for pattern recognition performed by the system of FIG. 4 in accordance with the principles of the present invention. In particular, in step 700, input 200 receives an input object and provides the input object to object detector 202a. In step 702, object detector 202a executes one or more algorithms to detect a target object and forms a plurality of segmented target objects. In step 704, pose estimator modules $204_1$–$204_n$ estimate a pose for the target object within their respective segmented target objects. In step 706, transform modules $206_1$–$206_n$ perform one or more transforms on their respective segmented input objects to form a plurality of transformed objects.

In step 708, normalization modules $208_1$–$208_{2n-1}$ normalize their respective transformed objects, e.g., to form a candidate image. In step 710, feature extractor modules $210_1$–$210_{2n-1}$ extract relevant features in their respective candidate images. In step 712, matching modules $212_1$–$212_{2n-1}$ search a database to find one or more matches for their respective candidate image. In step 714, accumulator 214 aggregates the recognition results from matching modules $212_1$–$212_{2n-1}$ and makes one or more recognition decisions.

In accordance with the present invention, a pattern recognition system makes one or more recognition decisions utilizing a plurality of transforms, a plurality of segmented target objects, or a combination of both, e.g., to account for variation factors. Accordingly, methods, apparatus and systems implemented consistent with the present invention can make more accurate recognition decisions. For example, in a face recognition experiment comparing the accuracy of a conventional recognition system with a pattern recognition system and method implemented consistent with the present invention, the following results were obtained as shown in Table 1 below:

TABLE 1

| Person | Conventional Method Recognition Accuracy | Inventive Method Recognition Accuracy |
| --- | --- | --- |
| 1 | 81.66% | 100.00% |
| 2 | 95.48% | 100.00% |
| 3 | 97.56% | 100.00% |
| 4 | 89.85% | 90.90% |
| 5 | 97.68% | 100.00% |
| 6 | 88.92% | 92.85% |
| 7 | 88.49% | 90.00% |
| 8 | 98.76% | 100.00% |
| 9 | 90.43% | 100.00% |
| 10 | 97.22% | 100.00% |
| 11 | 97.86% | 100.00% |
| 12 | 99.71% | 100.00% |
| 13 | 93.40% | 100.00% |

TABLE 1-continued

| Person | Conventional Method Recognition Accuracy | Inventive Method Recognition Accuracy |
|---|---|---|
| 14 | 92.61% | 100.00% |
| 15 | 98.51% | 100.00% |
| 16 | 98.81% | 100.00% |
| 17 | 87.58% | 100.00% |
| 18 | 99.88% | 100.00% |
| 19 | 91.21% | 100.00% |
| 20 | 98.84% | 100.00% |
| 21 | 95.48% | 100.00% |
| 22 | 89.15% | 100.00% |
| 23 | 80.24% | 88.88% |
| 24 | 97.03% | 100.00% |
| 25 | 99.21% | 100.00% |
| 26 | 97.82 | 100.00 |
| 27 | 91.67 | 90.90 |
| 28 | 93.25 | 100.00 |
| 29 | 98.96 | 100.00 |
| 30 | 98.64 | 100.00 |
| 31 | 84.32 | 100.00 |
| 32 | 99.33 | 100.00 |
| 33 | 99.20 | 100.00 |
| 34 | 95.58 | 100.00 |
| 35 | 65.43 | 77.77 |
| 36 | 97.82 | 100.00 |
| 37 | 77.48 | 80.00 |
| 38 | 98.34 | 100.00 |
| 39 | 96.01 | 100.00 |
| 40 | 89.87 | 100.00 |
| 41 | 80.67 | 81.81 |
| 42 | 91.38 | 90.90 |
| 43 | 99.43 | 100.00 |
| 44 | 98.25 | 100.00 |
| 45 | 98.07 | 100.00 |
| 46 | 99.38 | 100.00 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of aggregating a plurality of recognition results comprising the steps of:
    receiving a segmented target object and at least one transform of the segmented target object;
    performing at least one pattern recognition algorithm on the segmented target object and the at least one transform to generate a plurality of recognition results;
    aggregating the plurality of recognition results to determine a recognition decision; and
    outputting the recognition decision,
    wherein aggregating the plurality of recognition results is according to an equation:

$G_i(S_k(F_o(x)), \ldots, S_k(F_N(x))) = \max S_k(F_n(x))$ from 0 to N, wherein:

x denotes a segmented pattern in the segmented target object with N number of transforms performed, where n is $1 \leq n \leq N$;
    k denotes a pattern class;
    $F_N(x)$ denotes an extracted feature of an Nth transformed image, where $F_o(x)$ is an extracted feature of an original input pattern x;
    $S_k(F_o(x))$ denotes a probability that $F_o(x)$ belongs to a class k; and
    $G_i(S_k(F_o(x)), \ldots, S_k(F_N(x)))$ is an aggregation rule function indicating a possibility that $S_k(F_o(x)), \ldots, S_k(F_N(x))$ belongs to a class.

2. The method of claim 1, wherein the performing step includes performing in parallel a plurality of substantially identical recognition algorithms.

3. A method of aggregating a plurality of recognition results comprising the steps of:
    receiving a segmented target object and at least one transform of the segmented target object;
    performing at least one pattern recognition algorithm on the segmented target object and the at least one transform to generate a plurality of recognition results;
    aggregating the plurality of recognition results to determine a recognition decision; and
    outputting the recognition decision,
    wherein aggregating the plurality of recognition results is according to an equation:

$G_i(S_k(F_o(x)), \ldots, S_k(F_N(x))) = (1/N) S_k(F_n(x))$ from n=0 to N, wherein:

x denotes a segmented pattern in the segmented target object with N number of transforms performed, where n is $1 \leq n \leq N$;
    k denotes a pattern class;
    $F_N(x)$ denotes an extracted feature of an Nth transformed image, where $F_o(x)$ is an extracted feature of an original input pattern x;
    $S_k(F_o(x))$ denotes a probability that $F_o(x)$ belongs to a class k; and
    $G_i(S_k(F_o(x)), \ldots, S_k(F_N(x)))$ is an aggregation rule function indicating a possibility that $S_k(F_o(x)), \ldots, S_k(F_N(x))$ belongs to a class.

4. A method of aggregating a plurality of recognition results comprising the steps of:
    receiving a segmented target object and at least one transform of the segmented target object;
    performing at least one pattern recognition algorithm on the segmented target object and the at least one transform to generate a plurality of recognition results;
    aggregating the plurality of recognition results to determine a recognition decision; and
    outputting the recognition decision,
    wherein determining the recognition decision is according to an equation:

$$D(x) = j, \text{ if } G_j(S_j(F_o(x)), \ldots, S_j(F_N(x))) = \arg\max_{1 \leq k \leq K} G_k(S_k(F_o(x)), \ldots, S_k(F_n(x))),$$

wherein:
    D denotes a decision rule function;
    G is an aggregation rule function;
    x denotes a segmented pattern in the segmented target object with N number of transforms performed, where n is $1 \leq n \leq N$;
    j denotes a matching object;
    k denotes a pattern class;
    $F_N(X)$ denotes an extracted feature of an Nth transformed image, where $F_o(x)$ is an extracted feature of an original input pattern x; and
    $S_k(F_o(x))$ denotes a probability that $F_o(x)$ belongs to a class k.

5. A pattern recognition system comprising:
an input to receive an input object;
an object detector to detect a target object within the input object;
at least one transform module to perform at least one transform on the target object to form a plurality of transformed objects;
at least one pattern recognizer for generating a plurality of recognition results based on the target image and the plurality of transformed objects; and
a recognition result aggregator for determining a recognition decision based on the plurality of recognition results,
wherein the recognition result aggregator aggregates the plurality of recognition results according to an equation:

$$G_i(S_k(F_o(x)), \ldots, S_k(F_N(x))) = \max S_k(F_n(x)) \text{ from } 0 \text{ to } N,$$ wherein:

x denotes a segmented pattern in the segmented target object with N number of transforms performed, where n is $1 \leq n \leq N$;

k denotes a pattern class;

$F_N(x)$ denotes an extracted feature of an Nth transformed image, where $F_o(x)$ is an extracted feature of an original input pattern x;

$S_k(F_o(x))$ denotes a probability that $F_o(x)$ belongs to a class k; and $G_i(S_k(F_o(x)), \ldots, S_k(F_N(x)))$ is an aggregation rule function indicating a possibility that $S_k(F_o(x)), \ldots, S_k(F_N(x))$ belongs to a class.

6. The system of claim 5, wherein:
the at least one transform module is a rotation transformer.

7. The system of claim 5, wherein:
the at least one transform module is a boundary shift transformer.

8. The system of claim 5, wherein:
a plurality of substantially identical pattern recognizers operating in parallel generate the plurality of recognition results.

9. A pattern recognition system comprising:
an input to receive an input object;
an object detector to detect a target object within the input object;
at least one transform module to perform at least one transform on the target object to form a plurality of transformed objects;
at least one pattern recognizer for generating a plurality of recognition results based on the target image and the plurality of transformed objects; and
a recognition result aggregator for determining a recognition decision based on the plurality of recognition results,
wherein the recognition result aggregator aggregates the plurality of recognition results according to an equation:

$$G_i(S_k(F_o(x)), \ldots, S_k(F_N(x))) = (1/N) S_k(F_n(x)) \text{ from } n=0 \text{ to } N,$$ wherein:

x denotes a segmented pattern in the segmented target object with N number of transforms performed, where n is $1 \leq n \leq N$;

k denotes a pattern class;

$F_N(x)$ denotes an extracted feature of an Nth transformed image, where $F_o(x)$ is an extracted feature of an original input pattern x;

$S_k(F_o(x))$ denotes a probability that $F_o(x)$ belongs to a class k; and $G_i(S_k(F_o(x)), \ldots, S_k(F_N(x)))$ is an aggregation rule function indicating a possibility that $S_k(F_o(x)), \ldots, S_k(F_N(x))$ belongs to a class.

10. A pattern recognition system comprising:
an input to receive an input object;
an object detector to detect a target object within the input object;
at least one transform module to perform at least one transform on the target object to form a plurality of transformed objects;
at least one pattern recognizer for generating a plurality of recognition results based on the target image and the plurality of transformed objects; and
a recognition result aggregator for determining a recognition decision based on the plurality of recognition results,
wherein the recognition result aggregator determines the recognition decision according to an equation:

$$D(x) = j, \text{ if } G_j(S_j(F_o(x)), \ldots, S_j(F_N(x)))$$
$$= \arg\max_{1 \leq k \leq K} G_k(S_k(F_o(x)), \ldots, S_k(F_n(x))),$$

wherein:

D denotes a decision rule function;

G is an aggregation rule function;

x denotes a segmented pattern in the segmented target object with N number of transforms performed, where n is $1 \leq n \leq N$;

j denotes a matching object;

k denotes a pattern class;

$F_N(x)$ denotes an extracted feature of an Nth transformed image, where $F_o(x)$ is an extracted feature of an original input pattern x; and $S_k(F_o(x))$ denotes a probability that $F_o(x)$ belongs to a class k.

* * * * *

UNITED STATES PATENT AND TRADEMARK OFFICE
CERTIFICATE OF CORRECTION

PATENT NO. : 7,113,637 B2
APPLICATION NO. : 09/935683
DATED : September 26, 2006
INVENTOR(S) : Yea-Shuan Huang It is certified that error appears in the above-identified patent and that said Letters Patent is hereby corrected as shown below:

Column 12, line 20, "$G_i(S_k(F_o(x)), ..., S_k(F_N(x))) = (1/N)S_k(F_n(x))$" should read --$G_i(S_k(F_o(x)), ..., S_k(F_N(x))) = (1/N) \Sigma S_k(F_n(x))$--.

Column 12, line 63 "$F_N(X)$" should read --$F_N(x)$--.

Column 14, line 1, "$G_i(S_k(F_o(x)), ..., S_k(F_N(x))) = (1/N)S_k(F_n(x))$" should read --$G_i(S_k(F_o(x)), ..., S_k(F_N(x))) = (1/N) \Sigma S_k(F_n(x))$--.

Signed and Sealed this

Ninth Day of January, 2007

JON W. DUDAS
*Director of the United States Patent and Trademark Office*